Figure 1:
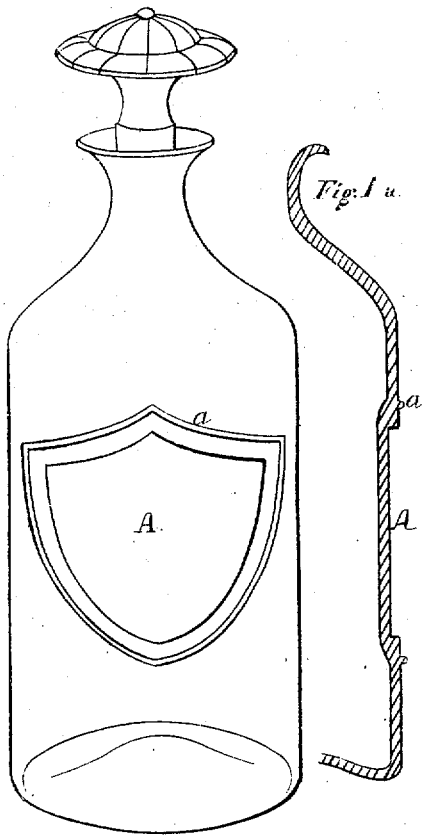

W. N. Walton,

Label.

No 2631. Reissued May 23 1867.

Witnesses,
Fred B. Lyons
H. Holdrege

Elma E. Walton
by assignee
per G. D. Law,
atty.

United States Patent Office.

ELMA E. WALTON, OF NEWARK, NEW JERSEY, ASSIGNEE BY MESNE ASSIGNMENTS OF WILLIAM N. WALTON.

*Letters Patent No.* 36,542, *dated September* 23, 1862; *reissue No.* 2,631, *dated May* 28, 1867.

DIVISION B.

IMPROVED BOTTLE FOR DRUGGISTS AND CHEMISTS.

The Schedule referred to in these Letters Patent and making part of the same.

TO ALL WHOM IT MAY CONCERN:

Be it known that WILLIAM N. WALTON, of Newark, in the State of New Jersey, formerly of the city of New York, in the county of New York, and State of New York, did invent a new and improved Method of Attaching Labels to Glass and other Bottles, thereby producing a new article of manufacture, and that the following is a full, clear, and exact description thereof, and of its construction and mode or manner of operation, reference being had to the accompanying drawings, and to the letters of reference marked thereon, and making a part of this specification.

For very many and most purposes for which bottles are used, and particularly for druggists' uses, and for holding poisonous and hurtful substances, it is very desirable and almost necessary that the labels used on such bottles should be permanently fixed or attached thereto, and also that such labels should be so secured that their inscriptions will be and remain plain and distinct, and not be liable to become indistinct or be destroyed or removed. Mistakes and accidents, often serious in their consequences, arising from the use of one article in the place of or supposed to be another, are thereby, by the use of such labels, more certainly and effectually guarded against and prevented.

Heretofore labels on bottles have been attached thereto in various ways. Sometimes the inscriptions have been painted directly upon the sides of the bottles; but when so attached they are very liable to soon become partially or wholly removed from cleaning the bottles; and fluids, as acids, oils, &c., dripping from their mouths, are also liable to injure or destroy the inscriptions, which then have to be again renewed, and often at a very considerable expense. Labels or inscription plates suspended from the necks of bottles have also been used; but such plates are liable to become mislaid, or lost, or misplaced, and it is also troublesome and difficult to keep them clean and the inscriptions distinct. Inscriptions have also been painted on glass plates, and then such plates cemented or fastened upon the sides of bottles, such plates standing out from the surface of the bottles; but such plates, when so applied, are much exposed, and liable to get knocked off from the bottle, and also to become loosened and detached, from the cement melting or losing its adhesive qualities; and there has been no means made use of, or plan devised, for preventing fluids, as acids, oils, &c., which may drip or run down upon the sides of the bottles, passing between the plate and the bottle, and thus soon defacing and destroying the inscription.

This invention is intended to remedy or remove such imperfections, and consists in forming or shaping the bottle, with reference to the label plate, so that such plate will be protected by the bottle, and also supported by it as well as by the adhesive material used to fasten the plate thereto; and also in so forming the bottle that any fluid dripping down its sides may be prevented passing between the label plate and the bottle; and then in attaching or combining the label or inscription plate with the bottle so formed, thereby effectually securing permanency, durability, and distinctness to the inscription.

The side of the bottle is shaped by moulds so as to form a recess or seat for the label plate, such recess or seat generally corresponding substantially in shape with such plate, thereby causing the bottle to furnish a protection to and support for the label plate, so that when properly fastened it will not be liable to move or slip from its proper position, or be knocked off from the bottle. A projecting bead or ridge also extends above and about the recess or seat for the label plate, so that any fluid dripping down from the mouth of the bottle will be prevented passing between the bottle and the label plate, and thereby preventing the defacing or destruction of the inscription from such cause.

Figure 1 is a side view of a bottle, shaped in a shield-like form to receive an inscription plate.

Figure 1* is a vertical section through such recess at its middle part.

Figure 2:
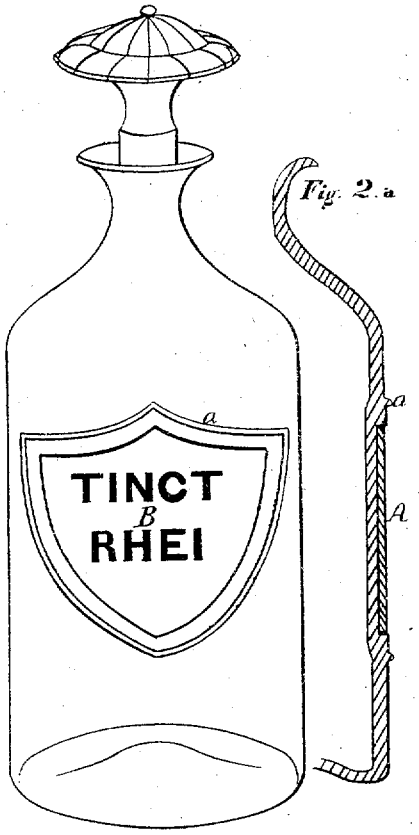

Figure 2 is a side or front view of a bottle like fig. 1, with the inscription plate in position and fastened therein.

Figure 2* is a vertical section of the same.

The recess or label seat A, in the side of the bottle, is made when the bottle is formed, and may be of any form or shape desired, and deep enough to receive the desired inscription plate B, which is generally of substantially the same shape with the recess A, and usually of such a thickness that when placed and fastened in its seat, the surface of the bottle and of the plate will be substantially the same. The inscription is painted or fixed in any suitable manner on the back side of the plate B, which is of glass or any suitable transparent substance, and such plate is then placed and secured in the seat A by cement or any proper adhesive material.

In order to prevent any fluid, as oils, acids, &c., which may drip from the mouth of the bottle or run down its sides, passing between the bottle and the plate A, and thereby loosen it, or deface or destroy the inscription, a slightly-projecting ridge, lip, or bead, *a*, may be formed in the bottle, extending above, and partially or wholly around, the recess A, so as to direct and lead off any fluid dripping down the bottle away from the plate and its recess. If the upper side of the recess A is horizontal, or nearly so, the ridge or bead *a* should be raised in the middle, or slightly arched, so as to more certainly direct and lead off any fluid away from the inscription plate.

By such construction of bottle and arrangement of inscription plate, such plate is protected against displacement, whether from blows or otherwise; and is supported by the bottle itself, as well as by the cement, and the inscription is guarded against contact with anything that may tend to deface or destroy it. For many uses, however, to which bottles are applied, there will be no occasion to protect the inscription against fluids and other matters otherwise than by the cement that fastens the plate to the bottle; and for such uses the ridge or lip *a* may be dispensed with, or its outline may be varied according to fancy. Protection to the plate A and to its inscription may also be secured by causing the ridge or bead *a* to stand out bolder or to a greater extent from the surface of the bottle, within which the inscription plate A, when properly marked, is to be placed and secured. Such form of construction will give all necessary support and protection to the inscription plate, and will also direct any fluids away from such plate and down the sides of the bottle. This plan of construction is not, however, considered as neat and desirable as the one first described.

When the ridge or lip *a* stands out, so as to form a cavity for the plate B, such plate will be *in relievo*, instead of being sunk below, or *in intaglio*, or even with the surface of the bottle; and in such case this ridge or bead *a* forms the enclosing outline, or a part thereof.

This method of forming bottles and supporting and protecting the label plates may be applied to all kinds of bottles, whether glass, earthen, or of other material, and the form of the label seat and of the inscription plate may be varied according to fancy or convenience.

What I claim as my invention, and desire to secure by Letters Patent, is—

A bottle formed with a recess or seat for a label, whether *in intaglio* or *in relievo*, and having secured therein, by cement or other suitable substance, a label with a glass or transparent label or inscription plate, as a new and improved article of manufacture.

ELMA E. WALTON.

Witnesses:

JAS. B. SHERIDAN,
JAMES H. PALMER.